A. J. APPLEGATE & B. E. SHATTUCK.
Reversible Broiler.

No. 224,761.  Patented Feb. 24, 1880.

Witnesses.
H. S. Talbot
W. R. Marble

Inventors.
Adoniram J. Applegate,
Burt E. Shattuck.
By Sylvenus Walker
Attorney.

UNITED STATES PATENT OFFICE.

ADONIRAM J. APPLEGATE AND BURT E. SHATTUCK, OF CAMBRIDGE, MASS., SAID SHATTUCK ASSIGNOR TO SAID APPLEGATE.

REVERSIBLE BROILER.

SPECIFICATION forming part of Letters Patent No. 224,761, dated February 24, 1880.

Application filed December 20, 1879.

*To all whom it may concern:*

Be it known that we, ADONIRAM J. APPLEGATE and BURT E. SHATTUCK, of Cambridge, in the county of Middlesex and State of Massachusetts, have invented certain new and useful Improvements in Reversible Broilers, of which the following is a specification.

The object of our invention is to provide means whereby the holding-clamp frames may be reversed, end for end, in their relative position to the handles, so as to permit food placed between the said clamp-frames to be cooked evenly, or so that when the portion nearest the fire is fully cooked that portion farthest from the fire may be turned into the position of the former, so as to be cooked without overcooking the portion previously cooked; and it consists in the construction, combination, and arrangement of pivoted clamp-frames for holding the food, with handles for opening and closing said frames, as hereinafter more fully described and set forth.

Figure 1:
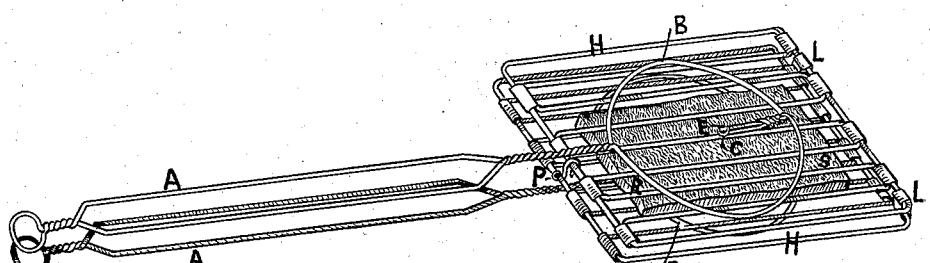
Figure 2:
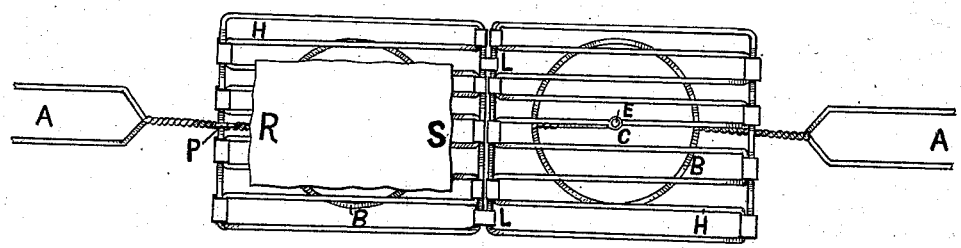
Figure 3:
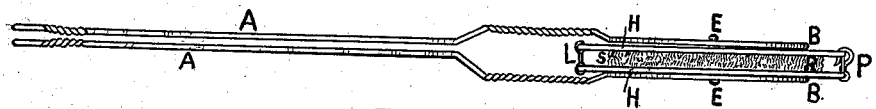

Figure 1 is a perspective view of our invention in a closed position, ready for use. Fig. 2 is a similar view, when open, for the reception of food to be cooked. Fig. 3 is an edge elevation of the same, showing the broiler clamp-frames reversed.

A A represent the handles, formed of wire, with a circular bearing, B, at the inner end of each, the wire being turned inwardly to the center of the circles B, and formed into an eye, C, into which is fitted a pivot, E, formed on the center wire of the broiler-frame H, and secured therein so as to permit the said wire broiler-frames H to be reversed or turned end for end, so that their relative position with the handles A may be changed when desired.

It will be understood that each handle A is provided with the circle B and eye C, and with a broiler-frame, H, having a pivot, E, fitted within the eye C. Thus both sides or halves of the broiler are formed in exact counterparts of each other, and hinged together at one end of the frames H by hinges L, their opposite ends being clasped or held temporarily by the hook P.

Now, it will be seen that if a slice of any kind of food be placed between the broiler-frames H, and the same are closed thereon and held together by the hook P or otherwise, the outer end or portion, S, of the said slice of food will, when placed within a stove over the coals or fire, be more readily cooked, or sufficiently done before the opposite end, R, is half done, (see Fig. 1;) but in order to permit the end S, when done, to be reversed, so as to cook the end portion, R, as shown in Fig. 3, it is only necessary to turn the broiler-frames H, when the opposite end is brought into position to be cooked, as above set forth.

The formation of the twisted portions of the handles A is such as to permit the frames H to be turned or revolved without opening said handles, as shown, Fig. 3.

Having thus described our invention, what we claim is—

The combination of the pivoted reversible broiler-frames H with the handles A, constructed substantially as described, and for the purposes set forth.

ADONIRAM J. APPLEGATE.
BURT E. SHATTUCK.

Witnesses:
SYLVENUS WALKER,
H. S. TALBOT.